June 27, 1950     C. E. SONNENBURG     2,513,256
SELF-RELEASING HOOK
Filed April 18, 1949
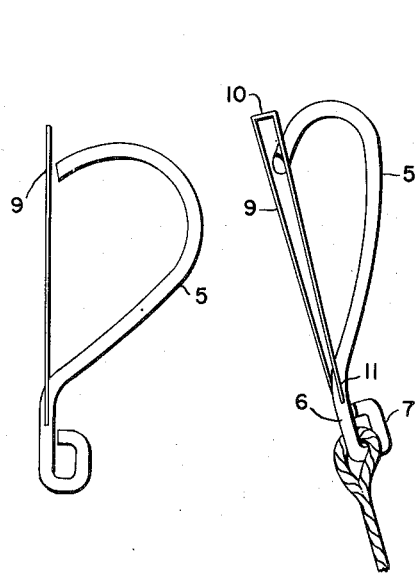
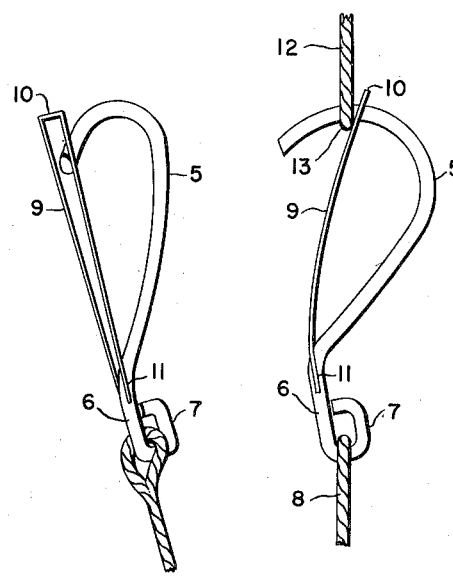
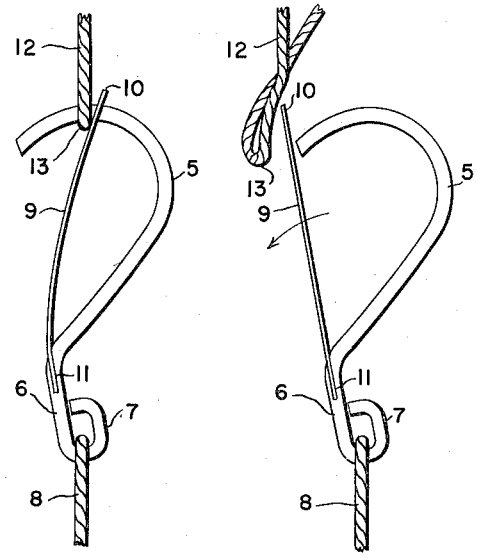
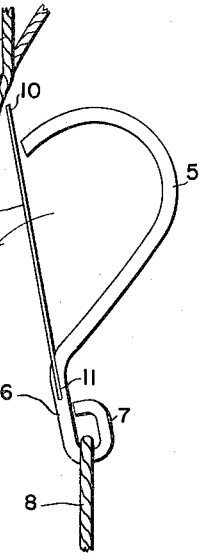
FIG.1A     FIG.1     FIG.2     FIG.3
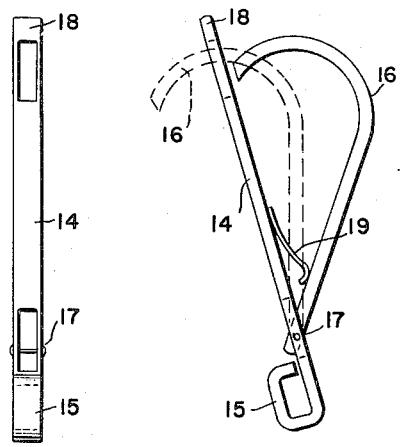
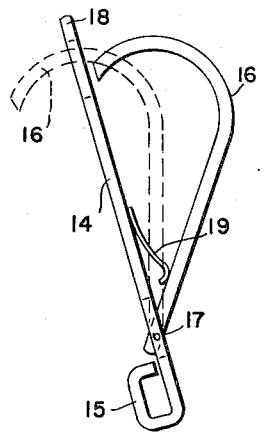
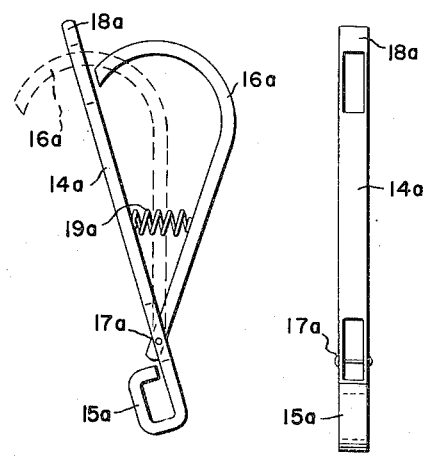
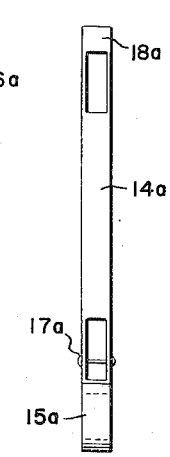
FIG.4A     FIG.4     FIG.5     FIG.5A
INVENTOR
Clarence E. Sonnenburg Patented June 27, 1950

2,513,256

UNITED STATES PATENT OFFICE 2,513,256

SELF-RELEASING HOOK

Clarence E. Sonnenburg, Kennewick, Wash.

Application April 18, 1949, Serial No. 88,170

6 Claims. (Cl. 24—230.5)

1

The present invention relates to improvements in a self-releasing hook, which may be used with chalk lines or for heavier duty.

An important object of the invention is to provide a self-releasing hook, which includes a hook having a spring actuated pusher, to the end, that one end of a line, such as a chalk line, will be pushed from the hook, when tension on the line is released.

Another object of the invention is to provide a simplified hook of the character stated, which can be manufactured very inexpensively and used for various kinds of work, especially in building constructions.

Other objects and advantages of the invention will become apparent to the reader of the following description.

In the drawing:

Figure 1 is a perspective view showing the hook in released position;

Figure 2 is a side elevational view showing the hook with the line under tension;

Figure 3 is a side elevational view showing the pusher after it has displaced the line;

Figure 4 is a side elevational view of a modified form of hook;

Figure 5 is a side elevational view of a third form of hook.

Fig. 1A is a side elevational view showing the hook in the normal open position.

Fig. 4A is an end view of the device shown in Fig. 4.

Fig. 5A is an end view of the device shown in Fig. 5.

Referring to the drawing, wherein like numerals designate like parts, it can be seen in Figure 2 that numeral 5 denotes a hook, preferably constructed of metal and having a shank 6, with its end bent to form an eye 7 to which an anchoring cord or cable 8 is attached. This cord or cable 8 may be attached to a nail or other anchor.

Numeral 9 denotes an elongated hairpin-shaped spring element having its bight portion 9 disposed over the curved portion of the hook member 5, while its ends are welded or otherwise secured as at 11 to the shank portion 6 of the hook.

Numeral 12 denotes a line such as a chalk line having a loop 13 for disposition over the hook 5 and against the outside of the spring 9 and as long as tension is held on the line 12, the pusher spring 9 will be held substantially in the position shown in Figure 2. Upon release of the tension on the line 12, the spring

2

9, which has been under tension, as shown in Figure 2, releases to displace the line 12. This is clearly shown in Figure 3.

A modification of the invention is shown in Figure 4, wherein a bar 14 is provided at one end with an eye 15 to which an anchoring cord or line is attachable.

Numeral 16 denotes a hook, pivotally secured as at 17 to the bar 14, adjacent the eye 15. The bar 14 at its other end has a curved portion 18 for riding over the outside of the curved portion of the hook 16.

A leaf spring 19 is secured as at 20 to the shank portion of the hook 16. The free end portion of the leaf spring 19 bears against the bar 14 to hold the bar and hook 16, substantially separated as shown in Figure 4. Of course the bar 14 is pushed inwardly on the hook 16 and the loop of a chalk line or the like is disposed over the hook at the outside of the bar 14 and the hook used in the same capacity as the hook 5, as shown in Figure 2.

Figure 5 shows a hook very similar to that of Figure 4, this disclosing a bar 14a and a hook 16a, the latter being pivoted as at 17a to the bar 14a. The bar 14a has the curved portion 18a for disposition over the hook 16a and an eye 15a to which an anchoring line or cord is attachable. The only difference between this form and the form shown in Figure 4, is the presence of a compression spring 19a interposed between the shank of the hook 16a and the bar 14a, instead of the leaf spring 19.

While the foregoing description sets forth the invention in specific terms, it is to be understood that numerous changes in the shape, size and materials may be resorted to, without departing from the spirit and scope of the invention, as claimed hereinafter.

Having described the invention, what is claimed as new is:

1. A releasing hook consisting of a hook element and a spring-biased releasing element connected together for relative angular movement, an eye portion fixed to one of said elements, the bill of said hook element, from a point thereon farthest from said eye portion to the end of said bill, extending uninterruptedly in a lateral direction from said point, and said releasing element being of a length to extend to said point farthest from said eye and, in unstressed condition, lying along the point of said bill.

2. The device in claim 1, the hook element being fixed to said eye portion.

3. The device in claim 2, the releasing element being a spring member fixed to said eye portion and hook element.

4. The device in claim 3, the releasing member having two legs extending from said eye portion to the sides of said bill portion; and an integral connecting portion between said legs extending around said bill.

5. The device of claim 4, the releasing member being pivoted to said hook element, and a spring between said elements.

6. The device of claim 5, in which the releasing element is fixed to said eye portion.

CLARENCE E. SONNENBURG.

REFERENCES CITED

The following references are of record in the file of this patent:

UNITED STATES PATENTS

| Number | Name | Date |
|---|---|---|
| 438,375 | Hubbard | Oct. 14, 1890 |
| 451,314 | White | Apr. 28, 1891 |
| 596,259 | Burke | Dec. 28, 1897 |
| 700,669 | Roeder | May 20, 1902 |
| 895,190 | Pike | Aug. 4, 1908 |
| 1,257,158 | Vetter | Feb. 19, 1918 |
| 1,391,625 | Geisler | Sept. 20, 1921 |
| 1,793,417 | Roberts | Feb. 17, 1931 |